June 7, 1955  R. E. CADDOCK  2,710,176
LIQUID METERING DEVICE FOR INTERNAL COMBUSTION ENGINES
Filed Dec. 3, 1951  3 Sheets-Sheet 1
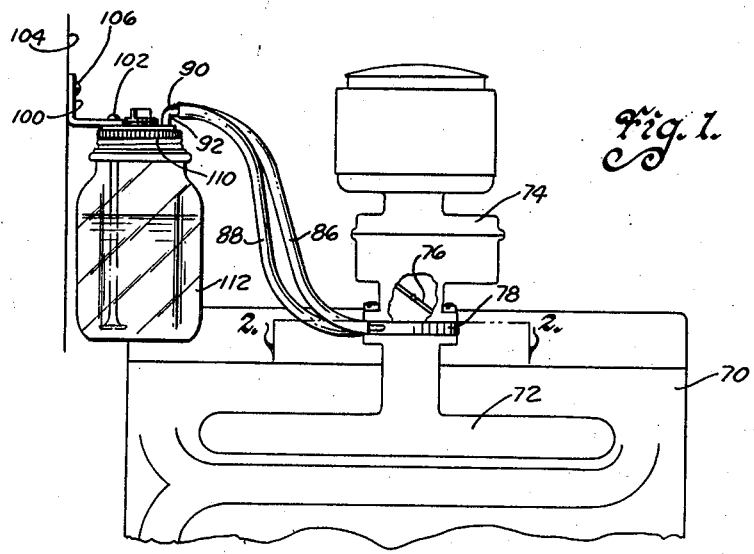
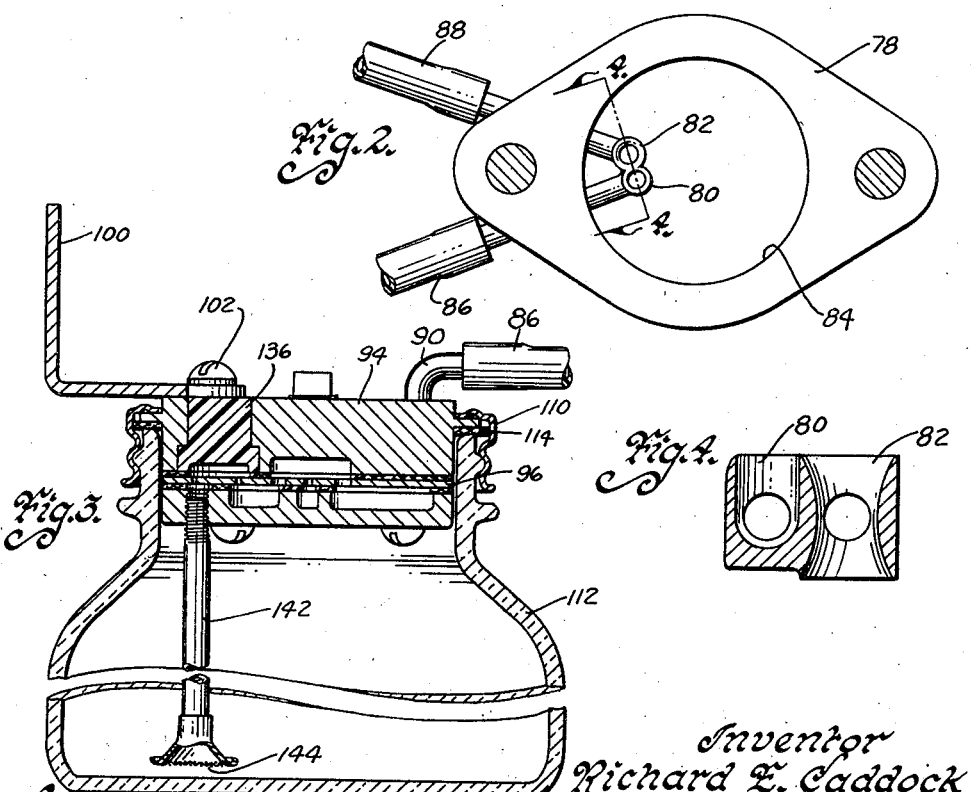
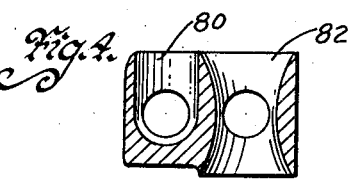
Inventor
Richard E. Caddock
by Talbert Dick & Adler
Attorneys
Witness
Edward P. Seeley

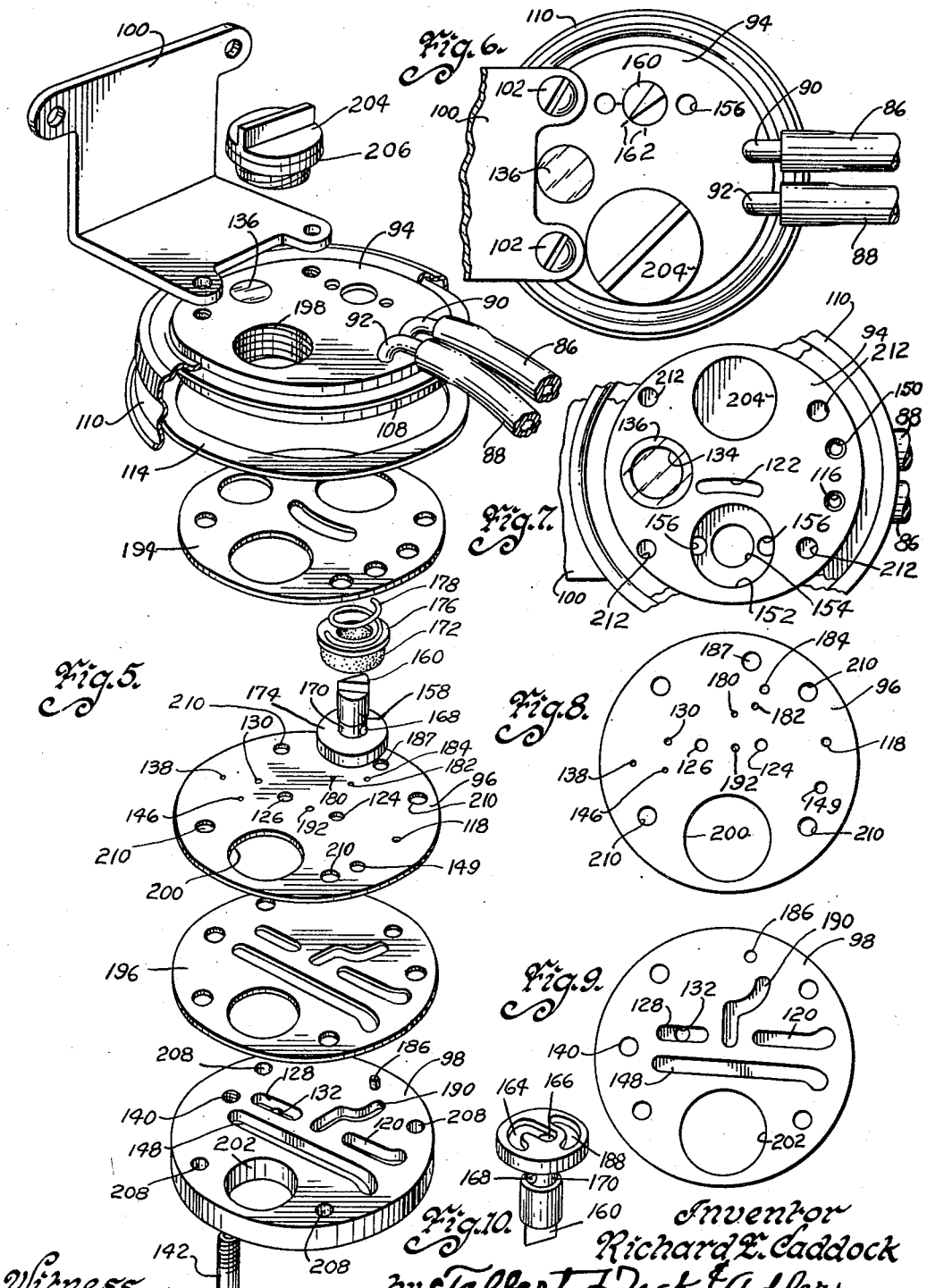

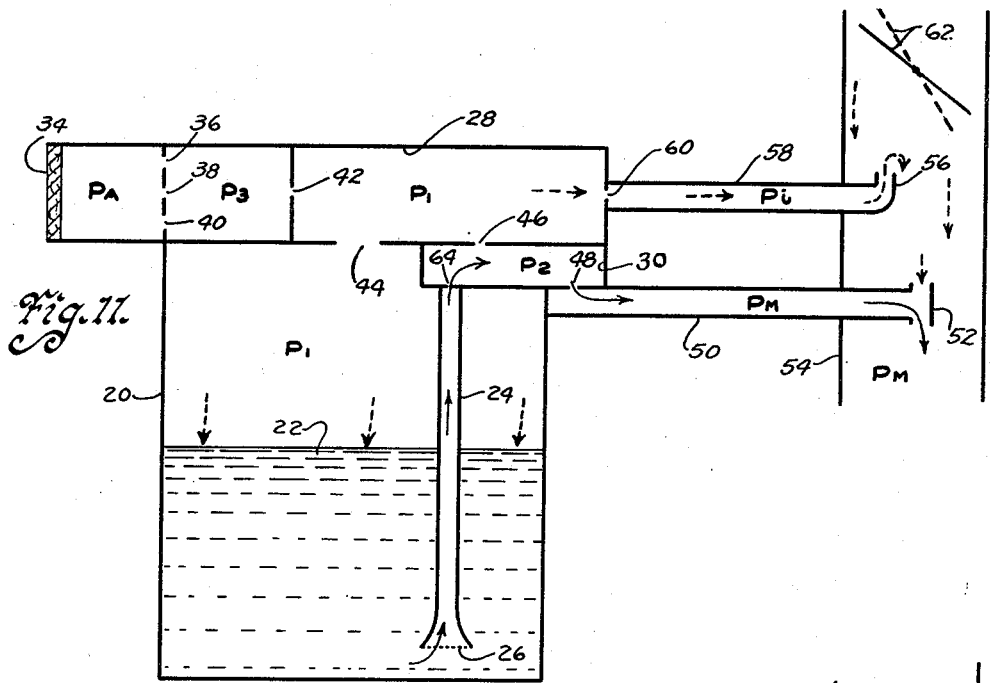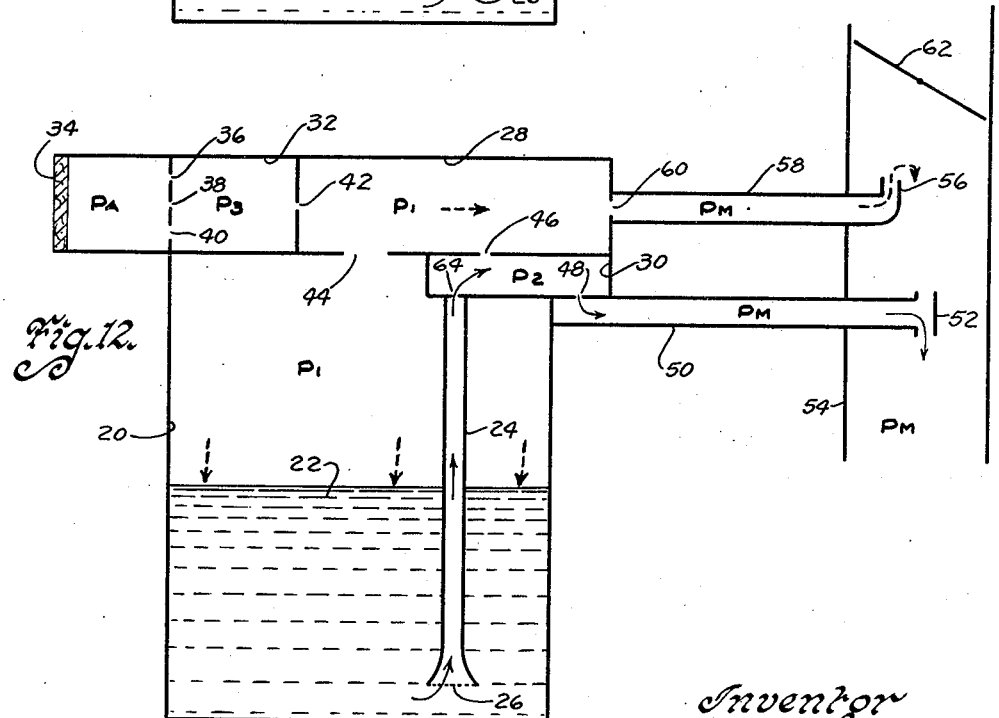

2,710,176

LIQUID METERING DEVICE FOR INTERNAL COMBUSTION ENGINES

Richard E. Caddock, Ames, Iowa

Application December 3, 1951, Serial No. 259,530

15 Claims. (Cl. 261—64)

My invention is a device for metering liquids into the intake system of an internal combustion engine in amounts that commencing with a given engine speed, increase as the speed of the engine increases.

In recent years, there has been a strong and increasing tendency toward providing automotive and other internal combustion engines with devices for metering auxiliary liquids into the fuel air intake system. The two liquids that are most frequently introduced have been water and engine conditioning liquids that soften and dissolve carbon such as the numerous upper cylinder lubricating liquids on the market. The device I have pictured and which I will describe in detail is one designed for use with these engine conditioning liquids. The idea of introducing the engine conditioning liquids into the intake system of an engine is not new. In fact, the earliest use of these liquids was a direct insertion of quantities of the liquid into the carburetor by hand pouring and then inserting more into the fuel in the gas tank to serve as a continuing treatment of the engine. The difficulty with the direct insertion of the liquid into the carburetor in large quantities is that it dissolves carbon too suddenly and that as an upper cylinder lubricant it is only present for a short time. Still another difficulty is the unwillingness of the operator to treat the engine regularly either because he does not wish to trouble himself or because he is unwilling or unable to afford the expense of having the treatment administered professionally. Furthermore, the liquid that is inserted into the fuel tank and which is metered to the engine with the fuel while it aids in reducing carbon deposits, offers little or no lubrication as it has been cut or reduced by the fuel.

To overcome these shortcomings of the hand administering of conditioning liquids, several dispensers have been invented that permit the insertion of the top lube directly into the intake manifold or carburetor as an oil in minute droplets and carried by the fuel air mixture into the induction system and cylinders as an oil to both dissolve carbon deposits and also lubricate the upper portions of the cylinders. These dispensers also avoid the difficulties either physical or financial involved in the old methods of administering these liquids. Because the liquid is inserted into the manifold either automatically or by merely pushing a button in the driver's compartment, almost anyone is willing to take the necessary trouble to insert the liquid into the engine. Furthermore, since the devices themselves are equal to only a few service charges, the expense of treating the engine is enormously reduced in the long term. Also, of course, an engine that is treated regularly usually produces much more power and is much more efficient than a non-treated, carbon clogged engine. These devices are very worthwhile and are becoming more and more widely used. Nevertheless, all of the devices on the market have shortcomings. The major drawback to all of these devices is that they are incapable of metering engine conditioning liquid in quantities related to engine requirements.

The factors which determine the amount of upper cylinder lubrication that is desirable for an engine are two. One of these two factors is the heat output of the engine. The other factor is the speed of the engine. When the engine is operated at a high rate of speed under load, both of these factors are high requiring large amounts of oil in order to properly lubricate. The high heat output of the engine destroys some of the oil as a lubricant which means that more oil must be administered to maintain lubrication during periods of high engine speed under load. It is also known that the amount of oil film that will build up on moving parts is a function of the speed of the parts. Rapidly moving parts can utilize more lubricant, therefore. There is a third factor that enters into a determination of the amount of engine treating liquids required by an engine when the liquid is of the type that performs a scavenging as well as a lubricating function. If the liquid is one of those that aids in keeping spark plugs free from gasoline lead deposits and dissolves carbon from valves, then the amount of liquid metered should also increase as gasoline consumption increases. This is true because the formation of lead and carbon deposits increases with an increase in gasoline consumption.

None of the presently known automotive metering devices meter liquid in accordance with engine requirements, but instead they all meter liquid to the engine in some ratio to the difference between manifold pressure and atmospheric air pressure. Those that use manifold vacuum to cause atmospheric air pressure to force liquid into the engine induction system will meter the greatest amount of upper cylinder lubricant during periods of deceleration when the engine is being used as a brake. Conversely, it meters the smallest quantities during periods of high engine speed under load when manifold vacuum is at a minimum. During periods of deceleration, although the engine may be rotating rather rapidly, the engine heat output is very low and gas consumption relative to engine speed is at a minimum. The amount of upper lube required is not great, therefore, which means that to have a very high rate of upper lube delivery is wasteful. In fact, a very high rate of upper lube metering during these periods of low heat output may cause fouling of the spark plugs. As engine speeds increase under load, the amount of upper cylinder liquid that is desirable increases, because the heat output of the engine is increasing. Also, gasoline consumption is high as loaded engine speed increases which means that more lead and carbon is being deposited and needs scavenging by an increased quantity of engine conditioning liquid. With the direct engine induction vacuum system of metering, however, the amount of liquid being administered decreases as engine speed increases. On the other hand, if the amount of oil metered at high engine speeds under load were merely set high enough to be adequate, then the amount metered during periods of deceleration would be so excessive as to interfere with normal engine operation. Hence this system can have only one point in the range of engine operating speeds when the amount of oil delivered is optimum. There is another type of unit that is controlled by the difference between atmospheric air and manifold pressures. This system uses a diaphragm to control a valve that meters the oil in an inverse manner to that described immediately above. However, such a unit can also have only one optimum point of metering in the range of engine speeds. Here again there is only one speed at which the amount of conditioning liquid will be ideal although the time of greatest oil delivery will be at high engine speeds under load. This inverse system starves the engine during the periods of deceleration, however, when the conditions for building up an oil film are favorable. All the known automatic systems are more or less inadequate, therefore, because their metering control systems are not related to engine demand.

Another type of device for inserting liquid into the manifold is one which incorporates a pump that is manually controlled for injecting conditioning liquids at regular intervals. This type of unit has the obvious shortcoming of depending on the memory of the operator for regularity of treatments. Also, of course, unless the operator is very familiar with the theory of engine upper lubrication needs, he is not apt to deliver oil to the cylinders when needed for lubrication. In any event, there is no necessary connection between the liquid delivered and engine requirements. I have also found that the continuous administering of small amounts of liquid is preferable to intermittent injections of considerable quantities.

Still another shortcoming of all the devices before now has been the location of the dispersal unit. It is usually located near the throttle butterfly pivot or on the low side of the throttle valve. At least one unit on the market directs the liquid onto the top of the choke valve. All of these locations are poor ones and for one reason or another are very inefficient. When the dispersal unit is placed under and on the low side of the throttle valve, almost no air flowing past the butterfly valve strikes the dispersal unit until very high engine speeds are achieved. When the unit is positioned under the pivot, almost no air ever strikes the unit. The dispersal of the oil through the system is not good unless the unit is in the air stream. The unit which dispenses the liquid onto the choke valve does place the oil in the air stream, but it is one of the pump type units. It is my belief that the units which meter a continuous flow of small quantities of liquid could not well be adapted to inserting liquid in this manner. It seems safe to say that heretofore no one seems to have appreciated the value of locating the dispersal unit on the high side of the throttle valve and in a particular position in that general locality.

In view of the foregoing, therefore, it is the principal object of my invention to provide a liquid metering device for internal combustion engines that meters liquids to engines in conformance with engine requirements.

It is a further object of my invention to provide a liquid metering device for internal combustion engines that may be adapted to commence metering at a variety of engine speeds.

It is a still further object of my invention to provide a liquid metering device for internal combustion engines that will meter accurately for minute quantities of liquid.

It is a still further object of my invention to provide a liquid metering device that has no moving parts.

Another object of my invention is to provide a liquid metering device that has a dispersal unit that is located in the most efficient position on the induction system.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of my liquid metering device mounted on a fragmentary portion of an internal combustion engine, Fig. 2 is an enlarged top view of the adapter plate with the Pitot head and dispersal head taken on the line 2—2 of Fig. 1, Fig. 3 is an enlarged vertical sectional view of the jar and metering means. Portions of the reservoir jar and tube are omitted from the drawing to conserve space.

Fig. 4 is an enlarged vertical sectional view of the Pitot head and dispersal head taken on the line 4—4 of Fig. 2, Fig. 5 is an enlarged exploded perspective view of the metering head, Fig. 6 is a top view of the reservoir cover. A portion of the bracket is deleted to conserve space, Fig. 7 is a bottom view of the reservoir cover with a portion of the reservoir cover broken away to conserve space, Fig. 8 is a top view of the plate, Fig. 9 is a top view of the bottom of the metering head, Fig. 10 is an enlarged perspective view of the basic flow control, Fig. 11 is a schematic flow chart illustrating the flow of materials throughout the system when the throttle butterfly valve is in an open position to produce an engine speed above twenty miles per hour. A nearly wide open throttle setting is shown with broken lines, and Fig. 12 is a schematic flow chart similar to the one that is Fig. 11 except that the butterfly valve of the carburetor is in the closed or idling position.

The system operates on differential air pressures. At idling, the differential is that which exists between atmospheric and intake manifold pressures. The direct difference between these two is about twenty inches of mercury which is far too great. My device, therefore, provides a pressure reduction system which controls this pressure differential and creates an operating pressure that is of desired strength and empirically determined. When the throttle butterfly valve is opened to create engine speeds above twenty miles per hour, the operating pressure is determined by the difference between reduced atmospheric air pressure, manifold pressure and a third element which is impact pressure of air rushing into the intake manifold and impressed on the impact or Pitot tube shown in Figs. 2 and 4. As actually constructed, the device is rather difficult to understand. This apparent complexity results because the device is constructed in a manner that makes it susceptible of mass production. For this reason, the operation of the device and its construction will first be discussed as illustrated in the flow charts. Once the operation of the device is understood, it will then be less confusing to describe the actual structure employed. The device itself may be correlated with the flow charts for better comprehension.

Referring first to Fig. 12, therefore, the numeral 20 designates a reservoir containing liquid which is to be metered to the engine such as conditioning liquid 22. A tube 24 provides a conduit to convey the conditioning liquid to the metering head. The numeral 26 designates a screen which may be placed in the lower end of tube 24 to prevent dirt that accidentally enters container 20 from being forced up the tube and lodged in an orifice of the metering head. The metering head itself consists of a pair of chambers and an atmospheric air pressure reduction system. One of the chambers is designated 28 and is called the differential pressure chamber and it has a pressure therein which is designated P1. The second chamber is called the flow pressure chamber and it is designated by the numeral 30. The pressure in this chamber will be identified in the discussion of operation by the numeral P2 which appears in the chamber in Figs. 11 and 12. The pressure reduction chamber is designated by the number 32 and the pressure that is produced there is designated P3. The numeral 34 designates a filter through which atmospheric air must pass to reach the metering head. Air passing through the filter and moving into chamber 28 must also pass through one or more of the orifices designated 36, 38 and 40 respectively. Since the orifices offer considerable resistance to air movement, a frictional pressure drop will be produced on the passage of air through them.

A still further pressure drop is produced by the passage of air through the orifice 42 leading from chamber 32 into the chamber 28. Numeral 44 designates a vent from chamber 28 leading into reservoir 20. Chambers 28 and 30 are connected by the orifice 46. As air passes through this orifice into chamber 30, a drop in pressure occurs as long as the orifice 48 is open. A tube 50 connects the chamber 30 to the dispersal unit 52 in the intake manifold 54. $Pm$ represents intake manifold pressure which varies with the operation of the engine. Since tube 50 is vented to the manifold, the pressure in tube 50 is always the same as that of the manifold which is abbreviated $Pm$.

Also in manifold 54 is the Pitot tube 56, and it is connected to chamber 28 by any appropriate conduit such as the plastic tube 58. An orifice 60 is the only connection between Pitot impact pressure or $Pi$ as it is labeled in Fig. 11 and the chamber 28. As air flows from chamber 28 through the orifice 60, therefore, there is a drop in pressure in tube 58 as compared to chamber 28. The rate of flow through orifice 60 determines the pressure in $Pi$ as will be explained in detail later. There is no $Pi$, however, when the butterfly throttle valve 62 is closed to the idling position as shown in Fig. 12. When the engine is idling, the pressure on the dispersal head 52 and the Pitot head 56 is manifold pressure or $Pm$ as both tubes are labeled in Fig. 12. Tube 24 may be vented to chamber 30, but the operation of the device is smoother if the orifice 64 is interposed between the outlet of tube 24 and chamber 30. Altogether, there is only one moving part in my device which is a means for determining whether orifice 36 is open alone or is open together with 38, or as a third possibility 36 is open simultaneously with 38 and 40. As higher $P3$ and $P1$ values are desired, more holes are opened, but none is closed. For this reason, one not understanding the operation of the device cannot adjust the control to a position that would cut off oil flow altogether. This control is not shown in Figs. 11 and 12, but its operation and structure will be explained in connection with the description of the device as actually constructed.

With the manual control set for the amount of engine conditioning liquid desired, and with conditioning or upper cylinder lubricating liquid in reservoir 20, the engine is started. As soon as the engine starts, the manifold 54 is partially evacuated by the action of the pistons in the cylinders. The pressure $Pm$ varies from engine to engine, but in the average automobile engine it will be approximately ten inches of mercury absolute, that is in reference to a theoretical absolute vacuum. By a similar standard, atmospheric air pressure will support a column of about thirty inches of mercury. There is a substantial pressure differential, therefore, between the air inlet at filter 34 and at dispersal head 52 and Pitot tube 56. There is a flow of air through filter 34 and into chamber 32 through orifice 36 which causes a pressure reduction in chamber 32 as compared to $Pa$. A second reduction in pressure occurs as the air passes into chamber 28 via orifice 42. These orifices are such a size as meter enough air into chamber 28 and through orifice 60 as to cause a pressure drop of about two inches of mercury in tube 58 as compared to chamber 28. At idling speeds the pressure in tube 58 is $Pm$. The two inch pressure drop just mentioned is created with only orifice 36 open. If orifice 38 is also open, the drop through orifice 60 is about three inches. When all three of the orifices 36, 38 and 40 are open, $P1$ is about fifteen inches of mercury absolute as compared to ten inches in tube 58. The empirically determined value of twelve inches for $P1$ when $Pm$ is ten is one that gives a satisfactory amount of oil flow of conditioning liquid to maintain an engine in good condition. This two inches of working pressure in chamber 28 will cause air to flow into chamber 30 via orifice 46 which offers frictional resistance to the flow causing a lower pressure to exist in chamber 30 than in chamber 28. The difference between $P1$ and $P2$ will cause some of the liquid 22 to be forced up tube 24 into chamber 30, since $P1$ is also exerted on the surface of liquid 22 via vent 44. If orifice 64 were a vent rather than a restricted passageway, there would be a surge of liquid into chamber 30 which would be sufficient to block orifice 48 altogether. As soon as orifice 48 is closed, $P2$ and $P1$ become equal at once. No liquid will flow up tube 24 if $P1$ and $P2$ are equal and hence the orifice 48 would soon clear which would cause the differential between $P1$ and $P2$ to be re-established with an immediate surge of liquid as previously. While this surging will actually cause substantially the correct amount of liquid to flow, the intermittent flow is not thought to be as desirable as a steady light flow. With the orifice 64 imposed between the upper end of the tube and the chamber 30, the flow is stabilized at an amount at which the liquid flowing merely restricts orifice 48 and brings $P1$ and $P2$ into a state of substantial equilibrium. The foregoing completes the description of the operation of the unit at engine speeds below twenty miles per hour.

After an engine speed equivalent to a speed of twenty miles per hour in high gear is attained, the butterfly throttle valve 62 is open far enough to produce a flow of air through manifold 54 sufficient as shown by the solid lines in Fig. 11 to produce a noticeable impact pressure on Pitot tube 56. It has been determined empirically that Pitot pressure, beginning at twenty miles per hour, increases at the rate of substantially one inch of mercury for each ten miles per hour of engine speed increase. Fig. 11 illustrates a situation in which the throttle is opened to a speed in excess of a twenty mile per hour engine speed. The impact pressure or $Pi$ is now a positive value. This $Pi$ impressed on tube 58 is additive to $Pm$ which is always impressed on Pitot 56. The rise in $P1$ necessary to continue the flow will be directly proportional to the increase in $Pi$. In our example, therefore, the absolute pressure in chamber 28 will now be greater than $Pm$ by the initial two inches of mercury caused by the pressure drop through orifice 60 plus the value of $Pi$. Actually, a portion of this increase in $P1$ is the result of the rising manifold pressure which also reduces the flow caused by $Pa$ through chamber 28. This increase in pressure caused by the rise in $Pm$ is so slight that it may be disregarded. Whenever $Pi$ increases, the amount of oil flowing through orifice 48 that will re-establish the stability of $P1$ and $P2$, will also increase. As $Pi$ increases with engine speed under load, the amount of oil or engine conditioning liquid will increase also which is a desirable relationship. This fact of increasing flow of liquids as engine speed under load increases, makes my liquid metering system adaptable to any engine metering problem. As the throttle is opened wider and wider, $Pi$ increases. The amount of liquid metered into the manifold 54 increases, of course. At the same time, however, the difference between $Pa$ and $Pm$ gradually decreases until a theoretical limit is reached at which point the throttle valve 62 is wide open and atmospheric air is rushing into manifold 54 at such a rate as to cause $Pa$ and $Pm$ to equal each other. This point is never reached actually, of course, since if $Pa$ and $Pm$ ever became equal, air would cease flowing into manifold 54. When air stops flowing, the engine stops. The tendency for these two values, $Pa$ and $Pm$, to equalize is important, however. It is the difference in pressure between $Pa$ and $Pm$ that causes any flow of air through chamber 28. Since $Pa$ and $Pm$ tend to approach each other in value, the rate of increase of liquid is not as rapid as the rate of increase of engine R. P. M. I have found, however, that while the engine needs more top lube at high speeds, it does not require an increase that is directly proportional to the increase in engine speed. The system as shown is ideal for engine conditioning liquids vented to the manifold. The amount of liquid metered at high engine speeds under load is sufficient not only to lubricate the upper portions of the cylinders, but also to provide an excess that is burned off by the high rate of heat out-put of the engine under these conditions. The quantities metered are also sufficient to serve the scavenging function to keep the spark plugs and valves clean and in good working condition.

When the engine compression is used as a brake during periods of deceleration, the vacuum in the manifold is considerably greater than at idling. Since the velocity of the air through the system varies directly only as the square root of the pressure differential, the drop through orifice 60 is very nearly the same as at idling. If $P_m$ is two inches less than at idling, the increase in differential pressure is only about ten per cent. The velocity of the air increases in an amount equal to the square root of the increase in pressure or only slightly over three per cent, which would have very little effect on the pressure drop through orifice 60. The end result is to have substantially the same amount of oil flowing during periods of deceleration as at idling. This amount of oil during deceleration is considered desirable, however, since engine heat output is low even though engine speeds may be high. Substantially no oil need be provided to scavenge since the materials to be scavenged are deposited in direct ratio to the consumption of fuel. The only oil needed is that necessary to build up a good oil film. The two inches of mercury differential is sufficient. In view of the foregoing it should be clear that my metering device meters engine conditioning liquid to engines in accordance with engine requirements. At the same time, my device is not wasteful of these expensive engine conditioning liquids. A system such as the one herein disclosed with only orifice 36 open, meters about one quart of liquid to the engine in twelve hundred miles. Furthermore, because the system responds to engine speed under load accurately, it can be depended upon to use the same amount of liquid for any given distance of travel.

I now turn to a description of the actual structure of my device as a practical working unit. Referring first to Fig. 1, the numeral 70 designates an ordinary automotive internal combustion engine having an intake manifold 72 supporting a fuel-air mixture unit such as carburetor 74. The fuel metering unit is provided with a butterfly throttle control valve 76 which is positioned in the unit throat at an angle so that one side is higher than the other. As the throttle valve is opened to increase the engine speed, this valve is tipped farther in the same direction as it is originally positioned. For this reason the valve may be said to have a low side and a high side. The adapter plate 78 is inserted between the carburetor or like unit 74 and the manifold 72 so that the Pitot tube 80 and dispersal head 82 are under the high side of the valve 76. By taking Pitot traverses using a manometer and a horizontally slidable Pitot head, it was determined that the most efficient position for the Pitot tube 80 was a point about fifteen per cent of the total distance across the opening 84 in plate 78 from the side of the plate adjacent to the high side of the valve. By most efficient I mean that the tube began to have impact pressures impressed on it at the lowest engine speeds as compared to any other location for it. This was also found to be the best location for the dispersal head also since it is advantageous to have the oil dispersed into the air stream. Such dispersal cannot occur unless the air stream strikes the dispersal head. The Pitot tube and the dispersal head are connected by any suitable conduits such as the plastic tubes 86 and 88 respectively, to the nipples 90 and 92 respectively in the metering head. Pitot tube 80 and dispersal jet 82 correspond to units 56 and 52 respectively. The dispersal head need not be of any particular shape. The size of Pitot tube 80 is not critical except that it must be larger than orifice 60 in Figs. 11 and 12. The metering head consists principally of the top 94, the plate 96 and the bottom 98, all of which show up in vertical sectional view of the head, Fig. 3. A bracket 100 is secured to the top 94 by any suitable means such as the screws 102 and supports the unit by depending it from the fire wall 104. The bracket is secured by any suitable means such as screws 106. Top 94 also has a shoulder 108 which engages the jar top 110 to secure it to the head. The jar top 110 threadably engages the jar 112 and the gasket 114 seals the two units. Of course any suitable reservoir could be used and the glass jar 112 is shown as preferable merely because the level of the liquid in the jar is readily determinable visually.

The actual mechanism of the device is probably best seen in Fig. 5, the exploded view in conjunction with the Figs. 7, 8 and 9. I begin my description of the structure by a description of the Pitot pressure system. The tube 86 and nipple 90 correspond to the tube 58 in Fig. 11. Nipple 90 connects through drilled passage 116 in metering top 94 to the orifice 118 in plate 96. Orifice 118 is the equivalent of orifice 60 in Figs. 11 and 12. This orifice connects to the channel 120 in metering head bottom 98 which makes a connection to the chamber 122 in top 94 via the hole 124 in plate 96. Chamber 122 is equivalent to part of chamber 28 in Figs. 11 and 12. Chamber 122 connects through hole 126 in plate 96 to milled chamber 128 in bottom 98 which extends over to orifice 130 in plate 96. Orifice 130 is equivalent to orifice 46 in the diagrammatic drawings. The chamber 128 is the equivalent of the other part of chamber 28. In the bottom of chamber 128 is a vent hole 132 which connects to the jar 112 and is the equivalent of vent hole 44 in Figs. 11 and 12.

There is a chamber designated 134 formed in the top which is equivalent to chamber 30 in the schematic drawings. This chamber may be merely milled in the top if desired, but I have made it in a piece of transparent material which is set in the top and extends through the top to provide an operation inspection window 136. Also leading into chamber 134 is orifice 138 which is the equivalent of orifice 64 and is connected to the hole 140 in bottom 98. Tube 142 is connected to hole 140 and is provided with dirt screen 144, and these parts are equivalents of tube 24 and screen 26 respectively in Figs. 11 and 12. Orifice 146 is equivalent to orifice 48 in the diagrammatic drawings and connects to milled passageway 148 in bottom 98. The milled passageway 148 connects via hole 149 in plate 96 to a drilled passageway 150 in top 94, which is connected to nipple 92 and tube 88. At the other end of tube 88 is the dispersal unit 82 and that completes a flow tracing of the Pitot and liquid conveying systems.

I shall now describe the idling metering or air vent and pressure reduction system. The numeral 152 designates a well in the top 94 which well has a concentrically located opening 154 in its center and extending entirely through the top. At each side of the well are similar holes designated 156. The well 152 is substantially filled by the plug 158. This plug is a combination control, conduit and filter support. At its top is a control knob 160 which is provided with a pointer to make proper settings of the knob in accordance with the indicia 162 easy and accurate. In the bottom of the plug is a milled passageway 164 which connects to a centrally located well 166. This well is pierced horizontally by bored passageway 168 which opens onto the sides of the shaft and in the area of a milled groove 170. A circular filter 172 fits over the shaft and rests on the shoulder 174 that is formed near the bottom of the plug. The filter 172 corresponds to filter 34 in the diagrammatic sketches. A washer 176 protects the filter from the coil spring 178 which spring serves to resist, by friction, rotation of the knob to prevent accidental change in the adjustment of the vent air control. In the plate 96 are the three additional orifices 180, 182 and 184 respectively. These three orifices correspond to the orifices 36, 38 and 40 respectively in the diagrammatic drawings. The amount of operating pressure that is brought into play at engine speeds equivalent to speeds below twenty miles per hour in high gear depends on the number of these three orifices that are opened. The number of orifices that are opened depends on the setting of the control knob 160. I never close any of these orifices, however, but rather I provide a means for progressively opening more of the orifices while retaining the orifice 180 in an open position. It is impossible, therefore, for someone attempting to get an intermediate adjustment, to stop liquid flow completely by setting the control knob 160 at a position between the indicia 162. A failure to turn the knob to an indicia mark merely fails to open the additional orifice. I also have provided a means for preventing the uninformed from turning the control knob too far. This structure is merely a peg or boss designated 186 which is rigidly secured to bottom 98, extends through hole 187 in plate 96, and engages the milled channel 188 in bottom of the plug. The control knob may be turned from one extreme to the other, or any intermediate position, but it cannot be rotated entirely away from the orifices 180, 182 and 184. The air vent system will always be open to some extent, therefore. These orifices communicate with chamber 190 in bottom 98 and this chamber is the equivalent of chamber 32 in the diagrammatic sketches. Chamber 190 extends to the approximate center of plate 96 and communicates with orifice 192 which is equivalent to orifice 42 in Figs. 11 and 12. Orifice 192 also connects to chamber 122 in top 94 and via this chamber and orifice 130 connects to chamber 134. The elements top 94, plate 96, and bottom 98 are sealed air- and liquidtight except for the openings herein described by means of appropriately cut gaskets 194 and 196. The top 94 has a thread hole 198 in it that aligns with the holes 200 and 202 in the plate and bottom respectively. These aligned holes provide a means for filling jar 112 with liquid without removing the jar from top 110. A threaded filler plug 204 and gasket 206 seal the filler hole when the device is not being replenished with liquid. The bottom, plate and top with their associated gaskets are held together in any suitable manner as by cap screws extending through the screw holes 208 in the bottom 210 in the plate and threading onto the screw threaded holes 212 in the top 94. The desirable sizes of the various orifices depend on the amount of liquid to be metered and I give the following as a group that were determined empirically to be satisfactory for one of my devices when metering engine conditioning liquid of the usual viscosity.

| Schematic Number | Actual number | Size Orifice in inches |
|---|---|---|
| 1. 36 | 180 | .016 |
| 2. 38 | 182 | .016 |
| 3. 40 | 184 | .035 |
| 4. 42 | 192 | .021 |
| 5. 46 | 130 | .020 |
| 6. 48 | 146 | .0145 |
| 7. 60 | 118 | .035 |
| 8. 64 | 138 | .0145 |

Some of the other uses to which my device may be put are for metering either fuel or water into an internal combustion engine. If used for fuel metering, the system would have to be very similar to the one I have illustrated since some fuel would be necessary at all engine speeds. If my metering system were to be adapted to water injection, however, it would seem advisable to use only the Pitot system for causing liquid to flow. One of the biggest disadvantages of water injection for automobiles is the tendency for it to cause rust because all of the water is not expelled from the engine before the engine is stopped. The water injection system for automobiles that is now on the market must be turned on or off as required by driving conditions. Many people tried to use these units to get greater power and economy, but they were unfortunately not well enough trained mechanically to use the units as they should be. The water injection was permitted to operate even at low engine speeds and just prior to stopping the engine. Moisture was left in the engine cylinders, therefore, which caused considerable trouble. These difficulties could be avoided if my metering system were used since it can be made to start metering automatically at any desired engine speed. The idling air vent would be eliminated and the Pitot tube would be advanced further under the butterfly valve. By moving the Pitot tube in farther, it may be made to begin acting at almost any desired engine speed. The correct Pitot position to start metering at the desired speed, whether it be forty miles per hour or whatever, would be determined empirically by running Pitot tube traverses as was done to determine the placement of the Pitot tube for the engine conditioning metering device which I have used as an illustration. By setting the injection system to operate only at engine speeds well above the usual driving speeds in town, the system would come into play only when relatively long drives were involved. Also, of course, since one seldom decelerates from road speeds to a stopped position and then stops his engine without operating at town driving speeds for several minutes, there is little likelihood that moisture will be left in the engine. An adaptation or subcombination of elements of my metering device would serve as an almost foolproof water injection system, therefore.

From the foregoing it should be clear that I have invented a metering device that achieves the objects of my invention.

Some changes may be made in the construction and arrangement of my liquid metering device for internal combustion engines without departing from the real spirit and purpose of my invention, and it is my intention to cover by my claims, any modified forms of structure or use of mechanical equivalents which may be reasonably included within their scope.

I claim:

1. A liquid metering device for use with internal combustion engines having an intake manifold, said manifold having an angled butterfly control valve for controlling the rate of flow of air into said manifold; said metering device comprising; a reservoir, liquid in said reservoir, a metering head having a means thereon for securing said reservoir thereto, a first chamber in said metering head, a first passageway in said metering head connecting said first chamber to the surrounding atmosphere, orifices in said first passageway for restricting air flow therethrough, a Pitot tube adapted to being mounted in the intake manifold of an internal combustion engine; said Pitot tube being positioned near the side of said manifold that is adjacent to the high side of said angled butterfly control valve, a conduit connecting said Pitot tube to said first chamber, a metering orifice in said conduit, a second chamber adjacent to said first chamber, a connecting orifice communicating between said two chambers, a dispersal jet adapted to being mounted in the intake manifold of an internal combustion engine, a conduit connecting said second chamber to said dispersal jet, and a tube connecting said second chamber to the interior of said reservoir and at a point below the level of said liquid.

2. A liquid metering device for use with internal combustion engines having an intake manifold, said manifold having an angled butterfly control valve for controlling the rate of flow of air into said manifold; said metering device comprising; a reservoir, liquid in said reservoir, a metering head having a means thereon for securing said reservoir thereto, a first chamber in said metering head, a first passageway in said metering head connecting said first chamber to the surrounding atmosphere, orifices in said first passageway for restricting air flow therethrough, a Pitot tube adapted to being mounted in the intake manifold of an internal combustion engine; said Pitot tube positioned at a point spaced from the side of said manifold that is adjacent to the high side of said angled butterfly control valve a distance that is equal to about fifteen per cent of the total distance across said manifold, a conduit connecting said Pitot tube to said first chamber, a metering orifice in said conduit, a second chamber adjacent to said first chamber, a connecting orifice communicating between said two chambers, a dispersal jet adapted to being mounted in the intake manifold of an internal combustion engine, a conduit connecting said second chamber to said dispersal jet, and a tube connecting said second chamber to the interior of said reservoir and at a point below the level of said liquid.

3. A liquid metering device for use with internal combustion engines having an intake manifold, said manifold having an angled butterfly control valve for controlling the rate of flow of air into said manifold; said metering device comprising; a reservoir, liquid in said reservoir, a metering head having a means thereon for securing said reservoir thereto, a first chamber in said metering head, a first passageway in said metering head connecting said first chamber to the surrounding atmosphere, orifices in said first passageway for restricting air flow therethrough, a Pitot tube adapted to being mounted in the intake manifold of an internal combustion engine under the high side of said angled butterfly control valve; a conduit connecting said Pitot tube to said first chamber, a metering orifice in said conduit, a second chamber adjacent to said first chamber, a connecting orifice communicating between said two chambers, a dispersal jet adapted to being mounted in the intake manifold of an internal combustion engine, said dispersal jet positioned under the high side of said angled butterfly control valve, a conduit connecting said second chamber to said dispersal jet, and a tube connecting said second chamber to the interior of said reservoir and at a point below the level of said liquid.

4. A liquid metering device for use with internal combustion engines having an intake manifold, said manifold having an angled butterfly control valve for controlling the rate of flow of air into said manifold; said metering device comprising; a reservoir, liquid in said reservoir, a metering head having a means thereon for securing said reservoir thereto, a first chamber in said metering head, a first passageway in said metering head connecting said first chamber to the surrounding atmosphere, orifices in said first passageway for restricting air flow therethrough, a Pitot tube adapted to being mounted in the intake manifold of an internal combustion engine under the high side of said angled butterfly control valve; a conduit connecting said Pitot tube to said first chamber, a metering orifice in said conduit, a second chamber adjacent to said first chamber, a connecting orifice communicating between said two chambers, a dispersal jet adapted to being mounted in the intake manifold of an internal combustion engine, said dispersal jet positioned under the high side of said angled butterfly control valve and at a distance from that side of the intake manifold that is fifteen per cent of the distance across said manifold, a conduit connecting said second chamber to said dispersal jet, and a tube connecting said second chamber to the interior of said reservoir and at a point below the level of said liquid.

5. In a liquid metering device for use with an internal combustion engine having an intake manifold and a butterfly throttle valve, a reservoir, liquid in said reservoir, a metering head associated with said reservoir in a sealed relationship, a first chamber in said metering head, a second chamber in said metering head, a third chamber in said metering head, a first orifice; said first orifice communicating between said first chamber to the surrounding atmosphere, a second orifice, said second orifice communicating between said first and second chambers, a Pitot tube adapted to being mounted in the intake manifold of an internal combustion engine under the high side of said butterfly throttle valve, a conduit communicating between said Pitot tube to said second chamber, a third orifice; said third orifice positioned in said conduit, a vent communicating between said second chamber and said reservoir at a point above the level of said liquid, a fourth orifice; said fourth orifice communicating between said second and third chambers, a tube extending into said reservoir and below the level of said liquid; said tube communicating with said third chamber, a dispersal jet adapted to being mounted in the intake manifold of an internal combustion engine, a second conduit; said second conduit communicating between said dispersal jet and said third chamber and a fifth orifice; said fifth orifice positioned in said second conduit.

6. In a liquid metering device for use with an internal combustion engine having an intake manifold and a butterfly throttle valve, a reservoir, liquid in said reservoir, a metering head associated with said reservoir in a sealed relationship, a first chamber in said metering head, a second chamber in said metering head, a third chamber in said metering head, a first orifice; said first orifice communicating between said first chamber to the surrounding atmosphere, a second orifice, said second orifice communicating between said first and second chambers, a Pitot tube adapted to being mounted in the intake manifold of an internal combustion engine and under the high side of said butterfly throttle valve, a conduit communicating between said Pitot tube to said second chamber, a third orifice; said third orifice positioned in said conduit, a vent communicating between said second chamber and said reservoir at a point above the level of said liquid, a fourth orifice; said fourth orifice communicating between said second and third chambers, a tube extending into said reservoir and below the level of said liquid; said tube communicating with said third chamber, a fifth orifice; said fifth orifice positioned in said tube, a dispersal jet adapted to being mounted in the intake manifold of an internal combustion engine, a second conduit; said second conduit communicating between said dispersal jet and said third chamber and a sixth orifice; said sixth orifice positioned in said second conduit.

7. The metering device of claim 6 in which the orifices bear the following relative sizes to each other, said third orifice being the largest, said fifth orifice being the smallest, said fourth orifice being of intermediate size between the sizes of said third and fifth orifices, said second orifice being of a size between those of said third and fifth orifices and said first orifice being of a size between those of said fourth and fifth orifices.

8. In a liquid metering device for use with internal combustion engines having intake manifolds and a butterfly throttle valve, a reservoir, a metering head, a first chamber; said first chamber communicating with the surrounding atmosphere through an orifice, a Pitot tube adapted to being secured in the intake manifold of an internal combustion engine and below the high side of a butterfly throttle valve, a conduit communicating between said Pitot tube and said first chamber through a second orifice, a second chamber in said metering head; said first and second chambers communicating with each other through an orifice, a discharge nozzle adapted to being mounted in the intake manifold of an internal combustion engine below the butterfly throttle valve, a conduit communicating between said discharge nozzle and said second chamber, and a tube communicating between said second chamber and the bottom of said reservoir, said first chamber being vented to the top of said reservoir.

9. The metering device of claim 8 further characterized by having an orifice imposed in said conduit between said second chamber and said discharge nozzle.

10. The metering device of claim 9 further characterized by an orifice being imposed in said tube communicating between said second chamber and the bottom of said reservoir.

11. The metering device of claim 10 further characterized by a third chamber, enclosing the space immediately surrounding the communicating means between said first chamber and the surrounding atmosphere; said third chamber having a plurality of orifices therein one or more of which are opened selectively to communicate between said third chamber and the surrounding atmosphere.

12. The metering device of claim 8 further characterized by a third chamber, enclosing the space immediately surrounding the communicating means between said first chamber and the surrounding atmosphere; said third chamber having a plurality of orifices therein one or more of which are opened selectively to communicate between said third chamber and the surrounding atmosphere.

13. In a liquid metering device for use with internal combustion engines having an intake manifold and a throttle valve; said throttle valve having a high side, a reservoir, a Pitot tube adapted to being positioned in said intake manifold of an internal combustion engine and below the high side of said throttle valve, a discharge nozzle positioned in said intake manifold, a conduit communicating between said Pitot tube to the upper portion of said reservoir; and a conduit communicating between said discharge nozzle and the lower portion of said reservoir, the means for mounting the Pitot tube and discharge nozzle consisting of a plate having holes therein that adapt it to being interposed between the intake manifold and carburetor of an internal combustion engine, and tubes extending through the side wall of said plate and communicating between said discharge nozzle, said Pitot tube and the conduits connecting them to said reservoir.

14. The metering device of claim 8 further characterized by the means for mounting the Pitot tube and discharge nozzle consisting of a plate having holes therein that adapt it to being interposed between the intake manifold and carburetor of an internal combustion engine, and tubes extending through the side wall of said plate and communicating between said discharge nozzle, said Pitot tube and the conduits connecting them to said metering head.

15. In combination, a liquid metering device for use with an internal combustion engine having an intake manifold and butterfly throttle valve, a liquid dispersing nozzle adapted to extend into such manifold and to be located below the high side of the butterfly throttle valve, a chamber communicating with the outside atmosphere and adapted to contain a liquid in its lower portion, a compartment in the upper portion of said chamber having an opening communicating with the inside top portion of said chamber, a conduit connecting said compartment with said nozzle; said conduit having a restricted passageway.

References Cited in the file of this patent

UNITED STATES PATENTS

| 2,239,305 | Tacconi | Apr. 22, 1941 |
| 2,303,640 | Hogg | Dec. 1, 1942 |
| 2,407,534 | Carolson | Sept. 10, 1946 |
| 2,458,256 | Crozier et al. | Jan. 4, 1949 |
| 2,482,102 | Dahle | Sept. 20, 1949 |
| 2,525,576 | Anderson | Oct. 10, 1950 |
| 2,533,863 | Wirth et al. | Dec. 12, 1950 |

FOREIGN PATENTS

| 859,473 | France | Dec. 19, 1940 |